United States Patent [19]

Corke

[11] 4,181,775

[45] Jan. 1, 1980

[54] ADHESIVE

[75] Inventor: Nicholas T. Corke, Linden, Belgium

[73] Assignee: N.V. Raychem S.A., Kessel-lo, Belgium

[21] Appl. No.: 798,479

[22] Filed: May 19, 1977

[30] Foreign Application Priority Data

May 24, 1976 [GB] United Kingdom ............... 21467/76
Feb. 15, 1977 [GB] United Kingdom ................ 6248/77

[51] Int. Cl.$^2$ ................................................ C08K 5/01
[52] U.S. Cl. .................................. 428/348; 260/18 N;
260/18 R; 260/28 P; 260/28 R; 260/28.5 A;
260/28.5 B; 428/355
[58] Field of Search ............. 260/28 R, 28 P, 28.5 A,
260/28.5 B, 18 R, 18 N; 428/348, 355

[56] References Cited

U.S. PATENT DOCUMENTS

| | | | |
|---|---|---|---|
| 3,249,629 | 5/1966 | Rogier | 260/78 UA |
| 3,444,026 | 5/1969 | Peerman | 260/18 N |
| 3,449,423 | 6/1969 | Nazy et al. | 260/78 UA |
| 3,792,002 | 2/1974 | Kriegel et al. | 260/18 N |

FOREIGN PATENT DOCUMENTS

| | | |
|---|---|---|
| 1594229 | 8/1969 | Fed. Rep. of Germany . |
| 1719128 | 9/1971 | Fed. Rep. of Germany . |
| 2118796 | 11/1972 | Fed. Rep. of Germany . |
| 1003709 | 9/1965 | United Kingdom . |
| 1178911 | 1/1970 | United Kingdom . |
| 1440810 | 6/1976 | United Kingdom . |

OTHER PUBLICATIONS

Handbook of Adhesives–Skeist (1962) pp. 425 to 433.
Adehesives & Resins–March (1957), vol. 5, #3, pp. 31 to 34 and 37.
Adhesives Handbook–Shields (1976) pp. 62 and 63.

Primary Examiner—V. P. Hoke
Attorney, Agent, or Firm—Lyon & Lyon

[57] ABSTRACT

Hot melt adhesives which are especially suitable for use with heat-recoverable plastics articles such as heat-shrinkable sleeves, wrap-around sleeves and end-caps are based on a combination of selected polyamides of relatively low molecular weight and relatively high amine equivalent, especially those based on dimer acids, and compatible waxes, especially low molecular weight paraffin and polyolefin waxes. The adhesive compositions advantageously comprise a tackifier, especially an aromatic tackifier, and preferred compositions include a minor amount of a rubber modifying agent to improve their low temperature flexibility and high temperature stability.

20 Claims, No Drawings

ADHESIVE

This invention relates to adhesives, especially hot melt adhesives for use in heat-recoverable products.

Commercially available adhesive and sealant systems based on polymeric materials can be broadly divided into two classes; thermosets and thermoplastics. The thermoset class inherently have better cohesive strength, are thermally stable and, in general, can be formulated to adhere to a wide variety of substrates, including both plastics and metals. In addition they perform well in load-bearing applications under varying conditions of temperature and pressure. However, they are difficult to apply in the field and require both time and heat for complete curing.

On the other hand, thermoplastic adhesives, or hot melt adhesives, develop their bond strength almost instantaneously, requiring no time for cure, and can be applied and reactivated relatively easily under quite severe environmental conditions. The use of such hot melt adhesives for bonding plastic compositions to other plastic compositions of the same or a different type or to metals is of course well known. In particular, hot melt adhesives are widely used in bonding plastic sleeves and end caps to power cables or conduits or to various types of metal or plastic pipe or tubing. Specifically desirable features for these melt adhesives include good low temperature impact resistance, i.e. the adhesive should not be brittle and frangible at low temperatures, and good peel strength at temperatures upto about 70° C. to which such materials may be exposed in service. In particular, good peel strength is especially desirable for cable splicing and capping applications using difficultly bondable substrates such as lead and polyethylene, but is not generally obtainable with available adhesives over the above indicated temperature range. Such wide temperature range applicability is important because winter temperatures in many areas can easily drop to temperatures well below 0° C. and conversely in direct sunlight a black cable or pipe can reach surface skin temperatures of at least +70° C.

Despite their heat-sensitivity, which precludes their use at high operational temperatures, especially in load-bearing situations, hot melt adhesives are preferred for use in heat-recoverable products. In recent years increasing attention has been paid to the use of articles exhibiting the property of elastic memory, in providing environmental insulation to electrically conductive wire and cable, pipelines and the like. An article having this property is one which has been deformed from an original heat-stable dimensional form into a different, heat-unstable form. While this article is maintained below a certain temperature, it will retain its unstable form but when it is heated to above this temperature, termed the recovery temperature, it will recover towards its original form. One method of imparting the property of elastic memory, and materials to which that memory may be imparted, are disclosed in U.S. Pat. No. 3,086,242 (Cook et al).

Generally, provision is made for adhesive bonding between the heat-recoverable article and the substrate about which it is recovered, and in certain cases the nature of the substrate has prevented obtainment of suitable bonds with most of the adhesives heretofore available. For example, it has become common to employ heat shrinkable polyethylene end caps in sealing polyethylene jacketed telecommunication lines, and much would be gained by extension of that technology to the lead-jacketed lines in widespread current use. Lead, however, is a notoriously poor adhesive substrate and the adhesives heretofore available have generally proved unsuitable, frequently affording peel strengths not significantly greater than about 3 pounds per linear inch (pli) at room temperature and even less at temperatures significantly above or below room temperature. As already indicated, while in service, telecommunication lines frequently encounter temperatures substantially greater and lower than room temperature. Currently extant specifications for cable end caps test peel strength at +70° C. Future specifications will undoubtedly require good peel strength at −40° C. as well as at +70° C. In addition to affording suitable peel strength over this temperature range, end cap adhesives must soften at a temperature which is below that at which the end cap itself is degraded yet which is sufficiently above the maximum service temperature so as to prevent the end cap "milking off" the cable end when in use. Quite recently, as described in German Offenlegungsschrift No. 23 47 779, an adhesive has been developed which will satisfactorily meet the above requirements.

One requisite of hot-melt adhesives for use with heat-recoverable products is that their reactivation temperature should be in the same range as or lower than, the recover temperature (which is typically in the range of from 90° C. to 135° C.) so that they can be reactivated simultaneously with recovery. With most adhesives previously proposed, the reactivation temperature lies from 50° to 90° C. below the recovery temperature, which is satisfactory from this standpoint, but places limitations on the maximum operational temperature, i.e. the recovered product plus adhesive does not function efficiently at temperatures near to the recovery temperature.

The adhesives described in German Offenlegungsschrift No. 23 47 779 have proved superior in this respect as their reactivation temperatures lie very close to the recovery temperature. Thus heat-recovered products provided with these adhesives function efficiently at much higher temperature approaching the recovery temperature. However, they have high viscosities and exhibit relatively poor flow and hence poor wetting properties even at their reactivation temperatures. Good flow properties are especially important when adhesion to irregular surfaces is required and where the recovery forces of the heat-recoverable product are insufficient to push the viscous adhesive into the surface irregularities. Thus despite their excellent high temperature properties these adhesives require special care in their application and use.

It follows that the ideal adhesive for use with such heat-recoverable products would not only possess excellent high temperature properties but would also be relatively easy to apply. In short, the solid-liquid transition should occur over a small temperature range close to the recovery temperature of the product and in the liquid state the adhesive should exhibit good flowability and wettability.

The present invention provides an adhesive composition consisting essentially of (a) 100 parts by weight of a polyamide having a number average molecular weight of from 2000 to 10,000; a softening point of from 90° C. to 150° C. and an amine equivalent of from 70 to 400; and (b) from 5 to 50 parts by weight of a wax.

The invention is based on our surprising discovery that by modifying certain conventional polyamide adhesives by the inclusion of at least one wax in an amount of from 5 to 50 parts by weight for each 100 parts of polyamide there may be obtained adhesive compositions which are especially suitable for use in heat-recoverable products in that they exhibit very good high temperature adhesion and yet exhibit excellent flowability and wettability at and around the recovery temperature. Typically, they are found to exhibit a temperature difference between complete functionality and reactivation which lies in the range of from 20° to 50° C.

Without in any way wishing to limit the present invention by theory, it is believed that the addition of the wax sharpens the already relatively sharp solid-liquid transition of the polyamides, possibly by acting as a hold-out agent, which enables the adhesive composition to retain its cohesive strength until just before the melt. In addition the incorporation of the wax lowers the viscosity in the liquid state and considerably improves the flow and wetting properties of the compositions and hence ease of application.

The polyamides used in the present invention have a number average molecular weight of from 2,000 to 10,000, a softening point of from 90° C. to 150° C. and an amine equivalent of from 70 to 400 (amine equivalent being the number of milliequivalents of perchloric acid required to neutralise one kilogram of the polyamide). Especially suitable polyamides for use in the present invention are based on dibasic acids, especially dimer acids, and although small amounts of tribasic and higher acids, e.g. trimer acid, may be present it is strongly preferred that they should not total more than 10% by weight of the acid component of the polyamide.

Typical polyamides are the condensation interpolymers of at least one diamine with one or more dibasic acids, with dimer acid being the preferred major dibasic acid component. These polyamides may be obtained by conventional amidification procedures and are generally prepared by reacting a molar excess of the amine group containing molecules with the carboxylic acid group containing molecules. The amount of excess amine utilised should be sufficient to provide a polyamide having an amine equivalent ranging from 70 to 400, preferably from 90 to 200.

Suitable diamines include primary diamines which may be ideally represented by the formula

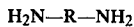

H$_2$N—R—NH$_2$ wherein R is an aliphatic, cycloaliphatic or aromatic radical, preferably having from 2 to 40 carbon atoms. While R is preferably a hydrocarbon radical, R may optionally also contain ether linkages such as in the diamines prepared from diphenyl ether. If R is aliphatic, it can be a saturated straight or branched chain radical. Representative of such diamines are the alkylene diamines having from 2 to 20 carbon atoms (preferably 2 to 6) such as ethylene diamine, 1,2-diamino propane, 1,3-diamino propane, 1,3-diamino butane, tetramethylene diamine, pentamethylene diamine, hexamethylene diamine, decamethylene diamine, and octadecamethylene diamine. In addition, aliphatic diamines carrying 1 to 3 lower alkyl substituents or a higher alkyl substituent are useful, for example, 2,5-dimethyl-hexamethylenediamine, 2-methyl-4-ethylhexamethylenediamine, 2-ethyl-4-methylhexamethylenediamine, a mixture of 2,4,4-trimethylhexamethylenediamine and 2,2,4-trimethylhexamethylenediamine or a mixture of 9-aminomethylstearylamine and 10-aminoethylstearylamine. In addition, aromatic diamines such as metaxylylene diamine, paraxylylene diamine and alicyclic diamines such as cyclohexylene diamine, 1,3-di-4-piperidyl propane, bis($\beta$-aminoethyl)-benzene, cyclohexane-bis(methyl amine), diaminodicyclohexylmethane, methylylene dianiline, bis(aminoethyl) diphenyl oxide and dimeric fat diamine can be utilized.

Dimeric fat diamine, sometimes referred to as "dimer diamine," "dimeric fat amine," or "polymeric fatty acid diamine" denotes the diamines prepared by amination of dimeric fatty acids as hereinafter described; reference is made thereto in U.S. Pat. No. 3,010,782. As indicated therein, these amines are prepared by reacting polymeric fatty acids with ammonia to produce the corresponding nitriles and subsequently hydrogenating the nitriles to the corresponding amines. Upon distillation, the dimeric fat diamine is provided which has essentially the same structure as a dimeric fat acid except that the carboxyl groups are replaced by —CH$_2$NH$_2$ groups. Further, this diamine is also described in Research and Development Products Bulletin, CDS 2-63 by General Mills, Inc., June 1, 1963, as "Dimer Diamine" illustrated by the formula H$_2$N—D—NH$_2$ where D is an approximately 36-carbon hydrocarbon radical of a dimeric fatty acid.

Diamines which are interrupted by oxygen atoms in the chain (also called ether diamines) and which are also suitable can be represented by the general formula:

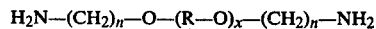

H$_2$N—(CH$_2$)$_n$—O—(R—O)$_x$—(CH$_2$)$_n$—NH$_2$ where n can be a number from 3 to 5, where x can have a value of 0, 1, 2, or 3, and where R is an alkylene group with a chain length of 1 to 12 carbon atoms, which may also carry alkyl substituents of 1 to 4 carbon atoms. Examples of ether diamines of this general formula are: 1,7-diamino-4-oxoheptane, 1,11-diamino-6-oxoundecane, 1,7-diamino-3,5-dioxoheptane, 1,10-diamino-4,7-dioxoundecane, 1,10-diamino-4,7-dioxo-5-methyldecane, 1,11-diamino-4,8-dioxoundecane, 1,11-diamino-4,8-dioxo-5-ethylundecane, 1,12-diamino-4,9-dioxododecane, 1,13-diamino-4,10-dioxotridecane, 1,14-diamino-4,11-dioxotetradecane, 1,11-diamino-4,8-dioxo-5,6-dimethyl-7-propionylundecane, 1,14-diamino-4,7,10-trioxo-tetradecane, 1,13-diamino-4,7,10-trioxo-5,8-dimethyltridecane, 1,20-diamino-4,17-dioxoeicosane and 1,16-diamino-4,7,10,13-tetraoxohexadecane.

Monoalkanolamines may also be employed as starting materials in place of or in conjunction with diamines. Suitable monoalkanol amines preferably have the general formula

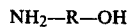

NH$_2$—R—OH where R is a divalent aliphatic hydrocarbon radical from 2 to 8 carbon atoms. Ethanolamine is preferred but further suitable compounds include propanolamine, butanolamine, 2-amino-3-hexanol, 2-amino-4-pentanol, 5-amino-4-octanol, 3-amino-3-methyl-2-butanol and similar compounds. Such alkanol amines, of course, afford polyester amides.

The diamine may be employed alone or mixtures of two or more may be employed. The most preferred diamines are the alkylene diamines in which the alkylene group has from 2 to 6 carbon atoms and mixtures thereof with dimeric fat diamine.

As heretofore indicated, the dibasic acid used to form the polyamide component advantageously consists predominantly of dimer acid. By predominantly is meant that at least 60% and, preferably, at least 90% of the carboxylic acid groups present are present in the dimer acid component of any dibasic acid mixture. It should be noted, however, that acceptable polyamides can be prepared using minor amounts or, indeed, no dimer acid. Other suitable dicarboxylic acids are enumerated hereinafter.

Dimer acid connotes a commercially available material obtainable by the coupling of unsaturated long chain monocarboxylic fatty acids, for example, oleic or linoleic acids. The resulting "dimer" is a mixture of many isomers, with various degrees of unsaturation and ring formation, depending on the unsaturation of the starting materials. The precise structure of the isomers and the proportions of each isomer in the mixture vary with the method of combination (which varies according to the manufacturer), and, of course, the starting material or materials. Trimers and higher degrees of polymerization may also be present to a minor extent.

The structure of these dimer acids has been the subject of considerable investigation. To indicate the background of this aspect of the invention, the following references are listed, but it is to be understood that the scope of the present application is not limited by or to the structures disclosed in the references.

Based on the work of R. F. Paschke, L. E. Peterson, and D. H. Wheeler, Journal of the American Oil Chemists' Society, 41, 723 (1964), it is conjectured that four possible structures for thermal dimers of 10-trans, 12-trans-linoleic acid are:

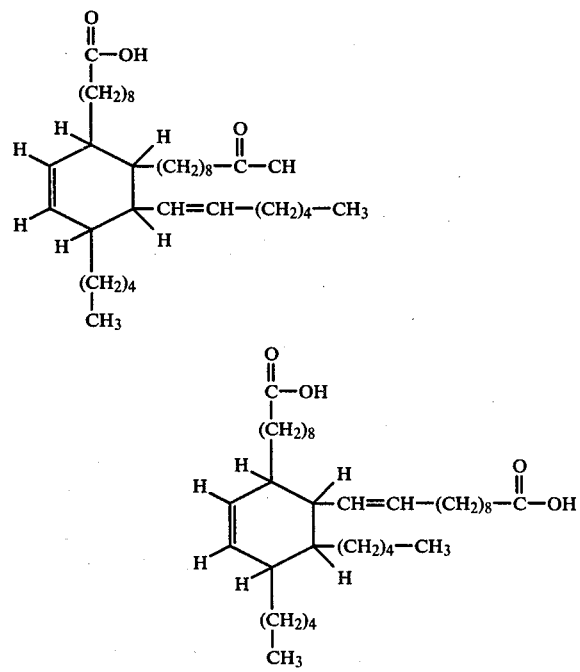

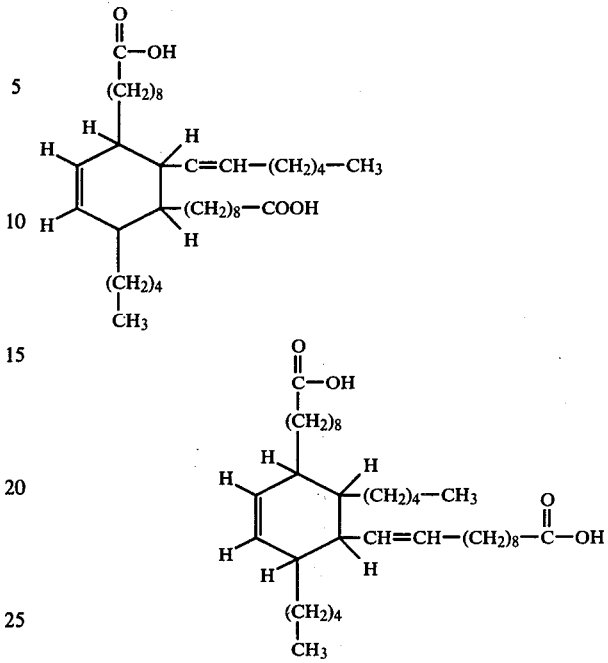

It will be noted that the number of carbon atoms between the carbonyl carbons varies between 18 and 21, that is, that the chain length is between 20 and 23 inclusive of the carbonyl carbons. Further, it will be noted that there are branches of up to 9 carbon atoms exclusive of the ring carbons.

J. C. Cowan, Journal of the American Oil Chemists' Society, 39, 723 (1962) discusses generally the possible structures of similar dimers. Emery Industries, Inc. Technical Bulletin 412B, "Abstracts of Dimer Acid Use-Patents and Journal References", January, 1967, at pages 2 and 3, gives abstracts of a number of references, and R. F. Paschke, L. E. Peterson, S. A. Harrison, and D. H. Wheeler, Journal of the American Oil Chemists' Society, 41, 56 (1966) discusses the structures of the dehydrodimer from methyl oleate with di-t-butyl peroxide. These references all in turn refer to other relevant literature.

These dimer acids, whatever their precise structure, which varies from producer to producer, all contain a mixture of isomers. At least some of the isomers, and in most cases all, contain some unsaturated carbon-to-carbon bonds, and to enhance oxidative stability of the amide prepared therefrom, these are preferably removed by hydrogenation to give a saturated, or predominantly saturated, product.

Other dicarboxylic acids are appropriately used in lieu of, or jointly with, dimer acid to increase the softening point of the polyamides obtained therefrom. Suitable dicarboxylic acids include aliphatic, cycloaliphatic, or aromatic dicarboxylic acids or esters which may be defined by the formulae:

$R_1OOC$—$COOR_1$ and $R_1OOC$—$R$—$COOR_1$ wherein the $R_1$ radicals, which may be the same or different, each represents hydrogen or an alkyl group (preferably having from 1 to 8 carbon atoms) and R is an aliphatic, cycloaliphatic, or aromatic hydrocarbon radical preferably having from 1 to 20 carbon atoms (the most preferred being where R is an alkylene radical having from 6 to 12 carbon atoms). Illustrative of such acids are oxalic acid, malonic acid, adipic acid, sebacic acid, suberic acid, pimelic acid azelaic acid, succinic acid, glutaric acid, isophthalic acid, terephthalic acid, the phthalic acids, benzenediacetic acid, p-phenylene dipropionic acid, the naphthalene dicarboxylic acid and 1,4- or 1,3-cyclohexane dicarboxylic acid.

The polyamides used in the practice of the present invention have a number average molecular weight ranging from 2000 to 10,000 preferably from 3000 to 7000. The number average molecular weight is appropriately measured by vapour phase osmometry (see "Polymer Handbook" 2nd edition, John Wiley and Sons, New York and "Polymer Science" Book 1, pp. 140-41, North Holland Publishing Company, Amsterdam).

For many applications it will be desirable for the adhesive to exhibit good low temperature properties, i.e. it should not be brittle or frangible under severe winter conditions. Accordingly it will be preferable for the polyamide to have a glass transition temperature below 10° C., preferably below 0° C. The glass transition temperature may be measured by differential scanning calorimetry (see, for example, "The reagent heat" A. A. Duswalt, Industrial Research, July 1975, p. 42) or by thermomechanical analysis (see, for example, "Application of Thermal Analysis to the Study of Polymer", W. E. Collins, Educational Seminar Pittsburgh Conference on Analytical Chemistry and Applied Spectroscopy, Cheveland, Ohio, March 1-6, 1970).

An especially preferred use for the adhesives of the present invention is with heat-recoverable products such as sleeves and end caps, usually made from cross-linked olefin polymers, especially polyethylene, and the present invention accordingly provides a heat-recoverable article provided with a layer of such an adhesive. In these articles, as discussed above, it is desirable for the adhesive to melt and flow simultaneously with the recovery of the article. Accordingly, the polyamides used in the adhesives of the present invention preferably have a softening point lying in the range of from 90° C. to 150° C., especially from 90° C. to 135° C., as measured by the ring-and-ball softening point method according to ASTM E-28.

As indicated above, the polyamides used in the present invention may readily be prepared by conventional techniques. Some commercially available polyamides suitable for use in the present invention are described in U.S. Pat. Nos. 3,249,629 and 3,449,273 and amongst especially suitable materials there may be mentioned Versalon 1300, Versalon 1140, Versalon TPX 600 and Type 401 (all available from General Mills Chemicals, Inc.) and Eurelon 2130 and Eurelon 1140 (both available from Schering AG.). These materials are all believed to be based on dimer acids, and have the following properties.

| Material | Softening Point °C. | Viscosity Poise | Mol. weight | Glass Transition Temp. °C. | Amine Equivalent |
|---|---|---|---|---|---|
| Versalon 1300 | c. 95 | c. 50(200° C.) | c.6500 | c.−15 | c.130 |
| Versalon 1140 | c.140 | c.100(200° C.) | c.4000 | c. 0 | c.140 |
| Versalon TPX 600 | c.135 | c.200(225° C.) | c.4000 | c. −5 | c.130 |
| Type 401 | c.120 | c. 90(200° C.) | c.3500 | c.−20 | c.140 |
| Eurelon 2130 | c.130 | c. 35(200° C.) | c.4000 | c.−15 | c.125 |
| Eurelon 1140 | c.140 | c.100(200° C.) | c.4000 | c. 0 | c.140 |

Other especially suitable polyamides may be made from substantially pure dimer acids.

The wax component of the adhesive compositions of the present invention is preferably present in an amount of from 5 to 40 parts by weight, especially from 10 to 20 parts by weight. The waxes are not adhesives or tackifiers in themselves but, as discussed above, it is believed that they act as hold-out agents for the polyamide component and thus sharpen the solid-liquid transition.

In view of the especially preferred use of the adhesives of the present invention with heat-recoverable products, as discussed above, it is preferred for the waxes to have a melting point of from 90° C. to 140° C. (i.e. similar to those of the preferred polyamides) although some suitable materials have melting points as low as 60° C. This melting point may be measured by Differential Scanning Calorimetry (DSC) the temperature taken being that at which the DSC plot shows that all the material has melted (see, for example "Determination of purity by DSC" Dupont Instruments Application Brief, Number 900B35). Waxes which exhibit a well defined melting or softening point as measured by DSC are especially preferred, i.e. those in which the solid to liquid transition takes place over a temperature range of not more than 30° C., preferably not more than 20° C.

Similarly, in order to give the adhesive good low temperature properties the glass transition temperture of the wax is preferably less than 10° C., advantageously less than 0° C.

Waxes suitable for use in the present invention are commercially available and may be chosen for the properties indicated as preferable above and for other properties desirable for any specific application. One factor which may influence the choice is the preferred viscosity of the adhesive composition, high viscosities being somewhat disadvantageous in view of both the ease of application of the adhesive formulation and the desired degree of flow upon reactivation. Typically, the adhesives should exhibit a viscosity of not much greater than 600 poise at 160° C. and 150 poise at 200° C.

Preferred waxes for use in the present invention are natural and synthetic waxes based on a hydrocarbon backbone, including polyolefin waxes and their derivatives. Synthetic waxes of this type are made, for example the Fischer-Tropsch and Ziegler processes.

Preferred waxes of this type have a number average molecular weight, as measured by vapour phase osometry, of from 300 to 10,000.

Especially suitable are those based on low molecular weight polyethylene generally having a molecular weight of less than 6,000, usually from 1,000 to 5,000. These waxes generally have softening points in the range of from 97° C. to 106° C. and those having a molecular weight between 2,000 and 4,000 generally have softening points between 100.5° C. and 104° C. Amongst suitable commercially available materials there may be mentioned the Epolene polyethylene waxes sold by Eastman Chemical Products, Inc. including Epolene C10, Epolene C15, Epolene N10 and Epolene N14; Veba waxes sold by Veba Chemie AG., including Veba B120, Veba A616 and Veba AX2729; F/S synthetic waxes, e.g. F/S PA130 sold by Franck and Steeman Ets; Hoechst Wax PA130 and PA520 sold by Hoechst AG; Polywax E-2020, Polywax 1000 and Polywax 2000 sold by Bareco, the A-C Polyethylenes sold by Allied Chemical and Dye Corporation and, especially, A Wax sold by BASF. It will be appreciated that at least some of these waxes contain substituents, e.g. side chains, which enhance their compatibility with the preferred polyamides.

Amongst suitable hydrocarbon waxes there may be mentioned Lunacerin W70, Lunacerin W80 and Lunaplast BX30 sold by Bayer and Ozonschutz 110.

Other suitable waxes include microcrystalline waxes, such as Lunacerin H185 and Lunaflex MG sold by Bayer and Fabricires waxes sold by Fabricires Spl, and ester waxes such as those sold by Hoechst AG.

It will be appreciated that blends of two or more waxes may be used.

In certain cases minor amounts of other compatible materials may advantageously be included, generally in amounts not exceeding 20%, preferably 10%, and more especially 5%, by weight of polyamide and wax together. One especially advantageous group of compatible materials which may be incorporated in such minor amounts are rubbers. Amongst suitable solid rubbers there may be mentioned, for example, ethylene/propylene rubbers, e.g. Nordel 2522, butyl rubbers, e.g. Butyl PB400, chloroprenes, and nitrile rubbers, e.g. Krymac 34/35 and Hycar 1052/30 Styrene/butadiene rubbers, e.g. Cariflex TR1102, polybutadiene rubbers, e.g. Firestone FCR 1261 and polybutenes such as Polybutene (Chevron) and Oronite 128 (B.P. chemical) may also advantageously be used as solid rubber modifiers. Amongst suitable liquid rubber modifiers there may be mentioned, for example Hycar 1312 (Goodrich) and CTBN (Goodrich).

It has been found that the incorporation of these rubbers leads to improvements in the low temperature flexibility and brittleness of the adhesive formulations and also improves their high temperature properties whilst maintaining an acceptable viscosity so that the adhesives can still be applied by conventional hot melt coating equipment. The adhesives thus exhibit an increased effective operational temperature range of, for example, from $-30°$ C. to $+80°$ C. Especially preferred rubber modifiers have Mooney Viscosities of less than 50, preferably 35 or below, as measured by standard methods (e.g. ML4 at 100° C. or ML1+8 at 127° C.)

The rubber modifiers are especially advantageously incorporated when the wax component is based on a polyolefin although they may, of course, be used with other waxes such as those mentioned above.

In general, the adhesive composition will include a tackifier, advantageously in an amount of up to 50 parts by weight, preferably from 5 to 40 parts by weight, especially from 10 to 20 parts by weight in order to ensure that the adhesion properties, especially to metal and polar substrates, are maintained. Aromatic tackifiers are especially preferred for their temperature stability. Suitable tackifiers include, for example, terpene phenol resins, such as Piccofyn A100 (ex Hercules Incorporated), hydrocarbon resins, such as Escorez 1102 (ex Exxon Corp.), resin derivatives, such as Staybelite ester 10 (ex Hercules Inc.), chlorinated biphenyls, such as Arochlor 1254 (ex Monsanto Corp.), wood resins, such as Vinsol (ex Hercules Inc.) and polyketone resins. Some of these and other suitable tackifiers are described in German Offenlegungsschrift 23 47 779 and in the following Examples. Other suitable materials will be apparent to those in the art.

Advantageously, the tackifier and wax are present in the weight ratio of from 30:70 to 70:30, preferably from 40:60 to 60:40, with approximately equal amounts being especially preferred. Advantageously, the total loading of wax plus tackifier does not exceed 50 parts, preferably not more than 40 parts.

The adhesives of the present invention may also contain one or more compatible plasticisers in order to enhance their physical properties such as flowability and thus facilitate application of the adhesives to heat-recoverable products. These will typically be present in amount of up to 50 parts by weight, preferably from 5 to 40 parts by weight. Amongst suitable plasticisers there may be mentioned toluenesulphonamides and derivatives thereof such as Santicizer 8 (ex Monsanto Corp.) which is a mixture of N-ethyl ortho and para toluene sulphonamides, phthalates, such as dioctylphthalate and diethyl phthalate, and related materials such as adipates.

The adhesive compositions according to the present invention may also contain minor amounts of, e.g. up to 10%, preferably not more than 5%, by weight of (a) and (b) together, conventional additives such, for example, as anti-oxidants, u-v stabilisers, hardeners, fillers, extenders, fortifiers, carriers, fungicides and preservatives of the type known in the art.

Amongst such additives there may especially be mentioned antioxidants, e.g. hindered phenols such as Irganox 1010 and 1098 (ex Ciba-Geigy), Plastinox (ex US Cyanamid) and Naugard 445 (ex US Rubber), and ultraviolet stabiliser such as Statex 160, a small particle size carbon black (ex Vanderbilt).

As mentioned above, the adhesives of the present invention are especially adapted for use with heat-recoverable products and, accordingly, in one aspect of the present invention provides a heat-recoverable article at least one principal surface of which is coated with an adhesive comprising (a) 100 parts by weight of a polyamide having a number average molecular weight of from 2000 to 10,000; a softening point of from 90° C. to 150° C. and an amine equivalent of from 70 to 400; and (b) from 5 to 50 parts by weight of a wax. Typically the coating thickness is from 0.5 to 1 mm.

Amongst such heat-recoverable articles there may be mentioned heat-shrinkable sleeves and end caps for the joinder encapsulation, insulation, corrosion protection and termination of electrical equipment, especially wires and cables, and service lines, e.g. oil pipes. Other heat-recoverable articles to which the adhesives of the present invention may advantageously be applied include so-called "wrap-around" sleeves as described, for example, in U.S. Pat. No. 3,379,218 and British Pat. Nos. 1,155,470; 1,211,988 and 1,346,479 and the "XAGA" cable splice described in British Pat. No. 1,431,167. However, the adhesives may, of course, be used in other applications not involving heat-recoverable products. One such application is, for example, in the duct-seal devices described in British Patent Application 45725/76.

The following Examples illustrate the invention, parts and percentages being by weight unless otherwise stated.

EXAMPLES

In these Examples, adhesive compositions are subjected to various tests, carried out as described below.

1. Pull-out Strength Test

This is a functional test to determine the force required to cause shear failure in a pipe coupling.

Two aluminium pipes of standard length (150 mm) and standard diameter (outside diameter 35 mm) are joined by a standard heat-shrinkable sleeve and the adhesive under test. The ends of the aluminium pipes are cleaned with solvent to remove grease and then abraded with emery paper No. 320 or its equivalent. The dust is removed with a clean dry cloth.

A strip of adhesive 1 mm thick and 12.5 mm wide is wrapped around one aluminium pipe at a distance of 12.5 mm from the end. The same is done for the second pipe. The two pipes are then assembled and the heat-shrinkable sleeve is shrunk around them to form the connection. After cooling the sleeve is trimmed so that its total length is 50 mm with 25 mm on each side of the join.

After 24 hours the coupling is placed in a tensile testing machine. It is allowed to condition for 30 minutes at the required temperature before testing. The speed of separation of the joint is 50 mm/min.

2. FTZ Cycling Test

This is a test designed by the Deutsche Bundespost to evaluate the performance of an adhesive in an end cap for capping off pressurised cables. The test method is identified as FTZ Specification No. 736,969 TV 1 section 5.12—Temperature and Pressure Cycling.

Heat-shrinkable end caps plus the adhesive under test are shrunk over the ends of pressurised cables, having both lead and polyethylene jackets. The resulting encapsulation is then cycled as follows:

1 cycle for 12 hours consisting of
    4 hours at −30° C.
    2 hours change
    4 hours at +70° C.
    2 hours change.

The internal pressure for lead cable is 0.8 kg/cm$^2$, for polyethylene 1.5 kg/cm$^2$. To pass the test there must be a retention of pressure for at least 10 cycles.

3. Viscosity

Measured according to ASTM 1084 method B "Tests for Viscosity of Adhesives". Viscosity was measured at 160° C. and 200° C. in accordance with ASTM D-1084 method B using a Brookfield Thermocel Viscometer Type HBT with spindle SC4-27. Results are given in poise and show the range for all shear rates and/or the average for all shear rates.

4. Softening Point

Measured according to ASTM E-28 "Test for Softening Point by Ring and Ball Apparatus" and given in °C.

5. Water Absorption

Measured at 23° C. and 50° C. according to ASTM D570 "Test for Water Absorption of Plastics". The results are given as percentage weight uptake of original weight.

6. Peel Strength

Measured by a test in which an uncoated heat-shrinkable polyolefin sleeve is recovered and adhered to a mandrel approximately 60 millimeters in diameter. The mandrel may consist of polyethylene telephone cable jacket, lead cable jacket, commercial neoprene cable jacket, rigid PVC pipe, steel pipe or another specified material prepared in a conventional manner for the test.

After shrinkage and cooling to ambient temperature the tubing is cut into 25 mm wide sections and slit longitudinally to provide a tab for insertion into a tensil testing machine. The specimens then remain for one day at room temperature before testing. Testing is carried out at a jaw speed of 50 mm/minute. Readings are taken every 12.5 mm of jaw separation after 25 mm initial separation. The average of at least five readings, given as kg/25 mm width, defines peel strength.

7. Shear Strength (a) Measured at 23° C. by the following test.

Joints are prepared using test pieces 25 mm±1 mm wide and 0.9±0.01 mm thick aluminium, coated aluminium alloy sheet, approximately 100 mm long. The test pieces are free from burrs and the surface is not scratched or roughened.

25 grams of sodium metasilicate (Na2SiO3.9H20) are dissolved in 1000 mls of distilled water. 2.5 grams of a nonionic detergent (e.g. Triton X-100 Rohm and Haas) are added and the solution is heated to 70° C. At least a 25 mm length of each test piece is etched in the metasilicate solution for 5 minutes. The aluminum is then washed well with distilled water and air dried.

Test joints are formed within three hours of the preparation of the test surfaces in metasilicate solution. The material is applied to one treated surface of each test piece so that an even, continuous film is formed. Test surfaces assembled to form joints overlap by not less than 12.5 mm and not more than 14.5 mm. The joints are placed under a pressure of 0.35 kg/cm$^2$ in an oven. The test joints are then stored at room temperature for one day before testing. The bonds are pulled in a suitable tensile testing machine with a jaw separation rate of 50 mm per minute at room temperature, the initial jaw separation being between 100 mm and 150 mm. The mean of five breaking loads is recorded as the shear strength.

(b) Measured at High Temperatures by the following method.

Joints are prepared by recovering and adhering an uncoated heat shrinkable sleeve to a mandrel with a diameter as large as convenient and an approximate length of 200 mm. The mandrel may consist of polyethylene telephone cable jacket, lead cable jacket, commercial neoprene cable jacket, rigid PVC pipe, steel pipe or another specified material prepared in a conventional manner for the test. After cooling and allowing to stand at ambient temperature for 24 hours, the tubing is cut into strips in accordance with ASTM D2733. The test specimens so prepared are conditioned at the test temperature for 30 minutes before testing. Testing is carried out at a jaw speed of 50 mm/minute and the mean of five breaking loads is recorded as the shear strength.

EXAMPLE 1

An adhesive composition A in accordance with the present invention was formulated from 150 parts Versalon 1300, 25 parts Epolene C15 and 25 parts Piccofyn A100 as polyamide, wax and tackifier, respectively. The peel strength of this adhesive to various substrates and at various temperatures was compared with that of four other commercially available adhesives as follows:

B=polyamide 401 (General Mills)
C=polyamide/polyethylene/tackifier composition in accordance with German Offenlegungsschrift 23 47 779
D=ethylene/vinyl acetate/wax—based adhesive E=standard ethylene/unsaturated acid copolymer adhesive.

The peel strength results are given in Table 1. RK 4010/1 is a substrate prepared by shrinking a crosslinked modified polyolefin sleeve onto a suitable mandrel.

It will be seen that the adhesive A exhibited peel strengths which were comparable with those of adhesive C and=superior to those of adhesive B. These three adhesives A, B and C were far superior to those of adhesives D and E.

The results further indicate that adhesive A exhibits an=adhesion strength comparable to that of adhesive C up to temperatures of 70° C.

The ability of adhesives A, B and C to withstand the FTZ temperature cycling test was also evaluated; the results being indicated in Table 2. Again it will be seen that the performance of adhesive A is at least equivalent to that of adhesive C and that the performance of both of these adhesives in much superior to that of adhesive B. Further measurements were carried out on adhesives A, B and C and these are also summarised in Table 2. It will be seen from the results that adhesives A and C are generally superior to adhesive B.

The viscosities of adhesives A and B at 160° C. and 200° C. measured using spindle SC4-27 were 350 and 75 poise; and 250 and 80 poise, respectively. In contrast the viscosity of adhesive C could not be measured with any spindle. Thus although adhesive C exhibits superior impact brittleness compared with adhesive A, the superior viscosity properties of the latter are of greater importance for ease of application by conventional hot-melt coating methods.

Finally, the softening curves of all five adhesives A to E were measured by thermo mechanical analysis as described earlier in this specification. The curves obtained indicated the following:

| Adhesive | Onset of solid-liquid transition $T_1$ | Completion of solid-liquid transition $T_2$ | Temperature range of solid-liquid transition T |
|---|---|---|---|
| A | 80° C. | 105° C. | 25° C. |
| B | 70° C. | 120° C. | 50° C. |
| C | 95° C. | 160° C. | 65° C. |
| D | 80° C. | 105° C. | 25° C. |
| E | 60° C. | 120° C. | 60° C. |

It will be seen that, in common with adhesive D, adhesive A in accordance with the present invention exhibits a desirably sharp liquid transition. This contrasts strongly with the larger transition range exhibited by adhesive C.

Thus, in summary, all of the above results indicate that adhesive A ranks with adhesive C in terms of their superior adhesion properties and that adhesive A further exhibits a desirably sharp solid to liquid transition between the temperature of 80° and 105° C. which makes it ideally suitable for use with heat-recoverable products. In addition its relatively low viscosity enhances its general applicability as an adhesive.

TABLE 1

| Adhesive | Temp. °C. | Peel Strengths (kg/25mm) RK 4010/1 | Copper | Steel |
|---|---|---|---|---|
| A | 23 | 55 | 55 | 55 |
|   | 50 | 33 | 32 | 30 |
|   | 70 | 11 | 10 | 13 |
| B | 23 | 42 | 29 | 29 |
|   | 50 | 12 | 11 | 10 |
|   | 70 | 4.0 | 3.5 | 4.5 |
| C | 23 | 55 | 31 | 33 |
|   | 50 | 32 | 30 | 17 |
|   | 70 | 12 | 15 | 5.5 |
| D | 23 | 7.5 | 6 | 4.5 |
|   | 50 | 3.0 | 2.0 | 2.0 |
| E | 23 | 11 | 14 | 13 |
|   | 50 | 8.5 | 2 | 1.5 |

TABLE 2

| | | General Properties | | |
|---|---|---|---|---|
| | Test Details | B | C | A |
| FTZ Cycling Tests | (a) polyethylene cable jacket. Average of 10 caps. Pressure 1.5 kg/cm$^2$. | Failed after 7–8 cycles | Some failed after 15–50 cycles | Very few failed between 15 and 50 cycles |
| | (b) lead cable jacket average of 6 caps Pressure of 0.8 kg/cm$^2$ | Failed after 5–9 cycles | Some failed after 15'50 cycles | Very few failed between 15 and 50 cycles. |
| Specific gravity | ASTM D 792 | 0.97 | 1.03 | 0.93 |
| Softening point | ASTM E 28 | 122° C. | 161° C. | 103° C. |
| Impact brittleness | ASTM D 746 | −15° C. | −40° C. | −13° C. |
| Peel strength at 23° C. (kg/25mm) Various substrates | (a) to polyethylene cable jacket | 25–40 | 25–30 | 25–40 |
| | (b) lead | 10–40 | 25–30 | 10–40 |
| | (c) pvc cable jacket | 10–15 | 25–35 | 10–20 |
| | (d) aluminum | 10–30 | 15–20 | 10–35 |
| Shear strength (Al/Al at 23° C.) | | 45 kg/cm$^2$ (oven temp. 150° C.) | 70 kg/cm$^2$ (oven temp. 200° C.) | 75 kg/cm$^2$ (oven temp. 150° C.) |

TABLE 2-continued

| Test Details | General Properties | | |
|---|---|---|---|
| | B | C | A |
| Water Absorption | ASTM D 570 | 0.4% | 0.2% | 0.1% |

EXAMPLE 2

Various adhesive compositions in accordance with the present invention and based on differing commercially available polyamides were formulated as follows:

| | A | F | G | H | I | J | K |
|---|---|---|---|---|---|---|---|
| Piccofyn A100 | 25 | 25 | 25 | 25 | 25 | 25 | 25 |
| Epolene C15 | 25 | 25 | 25 | 25 | 25 | 25 | 25 |
| Irganox 1010 | — | — | — | — | 3 | 3 | 3 |
| Versalon 1300 | 150 | — | — | — | 150 | — | — |
| Type 401 | — | 150 | — | — | — | 150 | — |
| Eurelon 2130 | — | — | 150 | — | — | — | — |
| Versalon 1140 | — | — | — | 150 | — | — | — |
| Polyamide A* | — | — | — | — | — | — | 150 |
| Tg (glass transition temperature) °C. | −14 | −15 | * | −10 | −14 | −14 | * |

*Polyamide A is based on pure dimer acid and has a molecular weight of 4500, an amine equivalent of 95-99 and a softening point of 95° C.

The peel strength, viscosity, softening point and water absorption of adhesives A, F, G and H are shown in Table 3. Various properties of adhesives I, J and K are compared with those of adhesives B and C in Tables 4 to 8.

It will be seen from the results set out in Tables 3 to 8 that the adhesives according to the present invention based on the polyamides Type 401, Eurelon 2130, Versalon 1140 and Polyamide A show similar properties to those exhibit by adhesive A and compare favourably with comparison adhesives B and C. Especially interesting is a comparison of adhesive J which comprises a wax in accordance with the present invention and adhesive B which is based on the same polyamide, Type 401, but does not contain the wax. Despite its reduced softening point of 110° C. compared with 122° C., adhesive J exhibits superior performance in the FTZ cycling test and has a superior water resistance. Also of interest is that the adhesive peel strength of adhesive K (based on pure dimer acid) to both polyethylene and lead does not decrease as the temperature is raised from 23° C. to 70° C.

TABLE 3

| Adhesive | Peel strength (kg/25mm) | | | | | | Viscosity (poise) 160°/200° C. | Softening point (°C.) | Water absorption (%) 23°/50° C. 24hr |
|---|---|---|---|---|---|---|---|---|---|
| | 23° C. | | | 70° C. | | | | | |
| | RK 4010/1 | steel | copper | RK 4010/1 | steel | copper | | | |
| A | 35 | 30 | 35 | 12 | 13 | 9 | 350/70 | 103 | 0.2/0.7 |
| F | 50 | 17 | — | 4 | 6 | — | —/100 | 110 | 0.4/1.3 |
| G | 25 | 20 | — | 4 | 4 | — | —/30 | 106 | 0.9/— |
| H | 33 | 4 | 16 | 4 | 8 | 10 | 1155/130 | 144 | — |

TABLE 4

| Adhesive | Pull-out force (kg) | |
|---|---|---|
| | 70° C. | 80° C. |
| B | 230 | 160 |
| C | 225 | 205 |

TABLE 4-continued

| Adhesive | Pull-out force (kg) | |
|---|---|---|
| | 70° C. | 80° C. |
| I | 210 | 175 |
| J | 225 | 150 |

TABLE 5

FTZ Cycling

| Adhesive | Cap Number | | | |
|---|---|---|---|---|
| | 1 | 2 | 3 | 4 |
| B | F8 | F8 | F10 | F12 |
| C | P15 | P15 | P15 | P15 |
| I | P15 | P15 | P15 | P15 |
| J | F8 | F12 | P15 | P15 |
| K | P15 | P15 | P15 | P15 |

(F8 = failed after 8 cycles; P15 = passed 15 cycles, etc.)

TABLE 6

| Adhesive | Viscosity poise 160° C./200° C. | Softening point | Water Absorption 24hr/1 week | |
|---|---|---|---|---|
| | | | 23° C. | 50° C. |
| B | 350/90 | 122 | 1.4/1.7 | 2.7/4.5 |
| C | — | 161 | 0.4/0.8 | 1.1/1.8 |
| I | 350/75 | 103 | 0.2/0.4 | 0.7/1.4 |
| J | */100 | 110 | 0.4/* | 1.3/* |
| K | 600/100 | 97 | 0.2/* | *1/* |

TABLE 7

Adhesive Peel Strength

| Adhesive | Temp. °C. | PE | Lead | Copper | Steel | RK 4010/1 | PVC |
|---|---|---|---|---|---|---|---|
| B | 23 | 27 | 42 | 29 | 29 | 42 | 12 |
| | 70 | 1 | 4 | 3 | 4 | 4 | * |
| C | 23 | * | 40 | 31 | 33 | >55 | * |
| | 70 | 11 | 3 | 6 | 15 | 12 | * |
| I | 23 | 41 | 38 | >55 | >55 | >55 | 20 |
| | 70 | 7 | 6 | 10 | 13 | 11 | 5 |
| J | 23 | * | * | * | 18 | >50 | * |
| | 70 | * | * | * | 7 | 5 | * |
| K | 23 | 8 | 12 | * | 12 | * | * |
| | 70 | 10 | 12 | * | 6 | * | * |

TABLE 8

Shear Strength (Kg/cm²)

| Adhesive | Temp. °C. | Al to Al | RK 4010/1 to PE | RK 4010/1 to LEAD |
|---|---|---|---|---|
| B | 23 | 46 | * | * |
| | 50 | * | 12 | 12 |

TABLE 8-continued

| Adhesive | Temp. °C. | Shear Strength (Kg/cm²) | | |
|---|---|---|---|---|
| | | Al to Al | RK 4010/1 to PE | RK 4010/1 to LEAD |
| | 70 | * | 3.5 | 4.0 |
| C | 23 | 69 | * | * |
| | 50 | * | >18 | 15 |
| | 70 | * | 9 | 10 |
| I | 23 | 53 | * | * |
| | 50 | * | 14 | 13 |
| | 70 | * | 2.5 | 2.5 |
| K | 23 | 92 | * | * |

EXAMPLE 3

Adhesives based on various waxes were formulated as follows

| Adhesive | A | L | M | N | O |
|---|---|---|---|---|---|
| Versalon 1300 | 150 | 150 | 150 | 150 | 150 |
| Piccofyn A100 | 25 | 25 | 25 | 25 | 25 |
| Epolene C15 | 25 | 15 | — | — | — |
| Lunacerin H185 | — | 10 | 25 | — | — |
| Lunaflex MG | — | — | — | 25 | — |
| A Wax | — | — | — | — | 25 |
| Irganox 1098 | — | — | — | — | 3 |

The properties of these adhesives are set out in Table 9. It will be seen that, in common with adhesive A, adhesives L, M, N and O exhibit very good high temperature peel strengths and have softening points within the desired range.

TABLE 9

| Adhesive | Peel strength (kg/25mm) | | | | | | | | | Viscosity (poise) 160/200° C. | Softening point (°C.) | Water absorption (%) 23/50° C. 24hr |
|---|---|---|---|---|---|---|---|---|---|---|---|---|
| | 23° C. | | | | | 70° C. | | | | | | |
| | RK 4010/1 | polyethylene | steel | lead | copper | RK 4010/1 | polyethylene | steel | lead | copper | | |
| A | 35 | 50 | 30 | 41 | 35 | 12 | 8 | 13 | 4.5 | 9 | 350/70 | 103 | 0.2/0.7 |
| L | 35 | — | 9 | 28 | 18 | 6 | — | 3 | 5 | 5 | 490/110 | 92 | 0.1/0.5 |
| M | >50 | — | >50 | — | — | 8 | — | 7 | — | — | —/40 | 97 | 0.1/1.3 |
| N | 38 | — | 18 | — | — | 8 | — | 7 | — | — | —/50 | 97 | 0.1/0.7 |
| O | — | 50 | — | 45 | — | — | 8 | — | 4 | — | 350/70 | 95 | 0.2/1 |

EXAMPLE 4

Various adhesives according to the present invention were formulated based on differing tackifiers, as follows

| Adhesive | A | P | Q | R | S |
|---|---|---|---|---|---|
| Versalon 1300 | 150 | 150 | 150 | 150 | 150 |
| Epolene C15 | 25 | 25 | 25 | 25 | 15 |
| Lunacerin H185 | — | — | — | — | 10 |
| Piccofyn A100 | 25 | 15 | 25 | — | 15 |
| Staybelite ester 610 | — | 10 | — | — | 10 |
| Polypale ester No. 1 | — | — | — | 25 | — |
| Tg° C. | −14 | * | −21 | * | * |

These adhesives exhibited the properties shown in Table 10. All the tackifiers produce very good high temperature peel strength. Suitable choice of tackifier can depress the glass transition temperature hence improving low temperature properties.

TABLE 10

| Adhesive | Peel strength (kg/25 mm) | | | | | | Softening point (°C.) | Water absorption (%) 23/50° C. 24 hr |
|---|---|---|---|---|---|---|---|---|
| | 23° C. | | | 70° C. | | | | |
| | RK 4010/1 | steel | copper | RK 4010/1 | steel | copper | | |
| A | 38 | 30 | 35 | 12 | 13 | 9 | 103 | 0.2/0.7 |
| P | 47 | 2 | 15 | 8 | 6 | 5 | 96 | 0.1/0.5 |
| Q | >50 | 30 | — | 17 | 18 | — | 102 | 0.2/0.9 |
| R | 48 | 28 | — | 15 | 16 | — | 104 | 0.2/0.9 |
| S | 20 | 10 | 27 | 7 | 8 | 8 | 100 | 0.1/0.6 |
| T | 30 | 17 | 18 | 5 | 1.3 | 1.8 | 89 | 0.1/0.3 |

EXAMPLE 5

Various adhesives according to the present invention and containing plasticiers and viscosity modifiers, were formulated as follows

| Adhesive | A | T | U | V | W |
|---|---|---|---|---|---|
| Versalon 1300 | 150 | 150 | 150 | 150 | 150 |
| Piccofyn A100 | 25 | 25 | 25 | 25 | 25 |
| Epolene C15 | 25 | 25 | 25 | 25 | 25 |
| Santiciser 8 | — | 15 | — | — | — |
| Hycar 1312 | — | — | 15 | — | — |
| Nordel 2522 | — | — | — | 10 | — |
| Butyl PB 400 | — | — | — | — | 10 |

These adhesives exhibited the properties shown in Table 11. As can be seen the adhesives exhibit peel strengths comparable with that of adhesive A and other generally desirable properties.

TABLE 11

| Adhesive | Peel strength (kg/25 mm) | | | | | | Softening point (°C.) | Water absorption (%) 23/50° C. 24 hr |
|---|---|---|---|---|---|---|---|---|
| | 23° C. | | | 70° C. | | | | |
| | RK 4010/1 | steel | copper | RK 4010/1 | steel | copper | | |
| A | 35 | 30 | 35 | 12 | 13 | 9 | 103 | 0.2/0.7 |
| T | 30 | 17 | 18 | 5 | 1 | 2 | 89 | 0.1/0.3 |

TABLE 11-continued

| Adhesive | Peel strength (kg/25 mm) | | | | | | Softening point (°C.) | Water absorption (%) 23/50° C. 24 hr |
|---|---|---|---|---|---|---|---|---|
| | 23° C. | | | 70° C. | | | | |
| | RK 4010/1 | steel | copper | RK 4010/1 | steel | copper | | |
| U | 20 | 10 | 27 | 7 | 8 | 9 | 95 | 0.1/0.5 |
| V | — | 17 | — | — | — | — | — | — |
| W | 22 | 13 | — | — | — | — | — | — |

EXAMPLE 6

This Example illustrates adhesive compositions which contain minor amounts of various rubbers in order to improve their properties.

|  | Adhesives | | | | | | | | | |
|---|---|---|---|---|---|---|---|---|---|---|
|  | 1 | 2 | 3 | 4 | 5 | 6 | 7 | 8 | 9 | 10 |
| Ingredient | | | | | | | | | | |
| Versalon 1300 | 150 | 150 | 150 | 150 | 150 | 150 | 150 | — | — | — |
| Polyamide A | — | — | — | — | — | — | — | 150 | 150 | 150 |
| Piccofyn A100 | 25 | 25 | 25 | 25 | 25 | 25 | 25 | 25 | 25 | 25 |
| Irganox 1098 | 3 | 3 | 3 | 3 | 3 | 3 | 3 | 3 | 3 | 3 |
| A Wax | 25 | 25 | 25 | 25 | 25 | 25 | 25 | — | — | — |
| Krynac 34/35 | 10 | — | — | — | — | — | — | — | — | — |
| Hycar 1052/30 | — | 10 | — | — | — | — | — | 10 | — | — |
| Nordel 1320 | — | — | 10 | — | — | — | — | — | 10 | 30 |
| Nordel 1635 | — | — | — | 10 | — | — | — | — | — | — |
| Nordel 2522 | — | — | — | — | 10 | — | — | — | — | — |
| Butyl PB 400 | — | — | — | — | — | 10 | — | — | — | — |
| Cariflex TR1102 | — | — | — | — | — | — | 10 | — | — | — |
| Properties | | | | | | | | | | |
| Peel Strength 23° C. polyethylene (kg/25mm) | >50 | >50 | >50 | >50 | >50 | >50 | >50 | 35 | 20 | 25 |
| 70° C. | 6 | 7 | 6 | 6 | 5 | 6 | 6 | — | 7 | 7 |
| Viscosity (poise) | | | | | | | | | | |
| (a) 160° C. | 520 | 450 | 540 | 520 | 460 | 480 | 540 | 560 | 600 | 1200 |
| (b) 200° C. | 150 | 140 | 140 | 110 | 140 | 130 | 140 | 130 | 140 | 300 |
| Softening point | 100 | 107 | 100 | 100 | 96 | 99 | 102 | 98 | 98 | 98 |
| FTZ cycling test polyethylene | P40 | P40 | P40 | P40 | P40 | P40 | P40 | P22 | P22 | P22 |

All of these formulations retained their peel strengths and their other properties after aging for 2 days at 100° C. Adhesives 2, 3, 8 and 9 are especially preferred.

EXAMPLE 7

Various adhesives according to the present invention and based on Versalon 1140, a polyamide with a high softening point, were formulated as follows.

| Adhesive | A | 11 | 12 | 13 |
|---|---|---|---|---|
| Versalon 1300 | 150 | — | — | — |
| Versalon 1140 | — | 150 | 150 | 150 |
| Piccofyn A100 | 25 | 25 | 50 | 50 |

-continued

| Adhesive | A | 11 | 12 | 13 |
|---|---|---|---|---|
| Epolene C15 | 25 | 25 | 25 | 25 |
| Santiciser 8 | — | — | — | 10 |
| Tg° C. | — | −1 | −10 | — |

The properties of these adhesives are set out in Table 12. It will be seen that adhesives 11 to 13 exhibit satisfactory peel strengths although these are not so good as those exhibited by adhesive A.

TABLE 12

| Adhesive | Peel strength (kg/25mm) | | | | | | Viscosity (poise) 160/200° C. | Softening point (°C.) | Water absorption (%) 23/50° C. 24 hr |
|---|---|---|---|---|---|---|---|---|---|
| | 23° C. | | | 70° C. | | | | | |
| | RK 4010/1 | steel | copper | RK 4010/0 | steel | copper | | | |
| A | 35 | 30 | 35 | 12 | 13 | 9 | 350/70 | 103 | 0.2/0.7 |
| 11 | 33 | 4 | 16 | 4 | 10 | 8 | 1155/130 | 144 | — |
| 12 | 21 | 13 | 20 | 4 | 1 | 9 | 450/90 | 138 | — |
| 13 | 40 | 11 | 14 | 2 | 0.2 | 2 | 240/45 | 128 | — |

EXAMPLE 8

Various adhesives according to the present invention and based on Versalon 1300 with varying proportions of Epolene C15 and Piccofyn A100 as wax and tackifier, respectively, were formulated as follows.

| Adhesive | 1 | 14 | 15 | 16 | 17 | 18 | 19 |
|---|---|---|---|---|---|---|---|
| Versalon 1300 | 150 | 150 | 150 | 150 | 150 | 150 | 150 |
| Epolene C15 | 25 | 25 | 25 | 10 | 75 | 25 | 25 |
| Piccofyn A100 | 25 | 25 | — | 25 | 25 | 10 | 75 |
| Irganox 1010 | 3 | 3 | 3 | 3 | 3 | 3 | 3 |

-continued

| | | | | | | | |
|---|---|---|---|---|---|---|---|
| Cinguasia Red BRT-790-D | — | 3 | — | — | — | — | — |
| Tg | −14 | * | −10 | −14 | * | −8 | * |

| Adhesive | 20 | 21 | 22 | 23 |
|---|---|---|---|---|
| Versalon 1300 | 150 | 150 | 150 | 150 |
| Epolene C15 | 10 | 75 | 10 | 75 |
| Piccofyn A100 | 10 | 75 | 75 | 10 |
| Irganox 1010 | 3 | 3 | 3 | 3 |

The peel strengths of these adhesives to various substrates at 23° C. and 70° C. and their viscosities are given in Table 13.

The pull out strengths and shear strengths of adhesives I, 20, 21, 22 and 23 are given in Table 14 and are compared with those of adhesives B and C (Example 1).

TABLE 13

| | Peel Strength (kg/25mm) | | | | | | Viscosity (poise) |
|---|---|---|---|---|---|---|---|
| | 23° C. | | | 70° C. | | | |
| Adhesive | PE | lead | steel | PE | lead | steel | 160/200° C. |
| I | 27 | 41 | 38 | 7 | 5 | 16 | 350/70 |
| 14 | >55 | 38 | >55 | 7 | 8 | 11 | 350/80 |
| 15 | 40 | 30 | 41 | 7 | 7 | 9 | 550/100 |
| 16 | >55 | 50 | 38 | 7 | 10 | 11 | 390/90 |
| 17 | — | — | — | — | — | — | 520/110 |
| 18 | 34 | 33 | 38 | 7 | 10 | 6 | 515/90 |
| 19 | 32 | 25 | 28 | 6 | 8 | 12 | 300/55 |
| 20 | >55 | >55 | 44 | 9 | 10 | 14 | 460/95 |
| 21 | — | — | — | — | — | — | 540/130 |
| 22 | >55 | 32 | 34 | 5 | 6 | 13 | 270/50 |
| 23 | 27 | 21 | 30 | 8 | 5 | 7 | 300/75 |

TABLE 14

| | Pull-out Strength | | Al/Al | Shear Strength | |
|---|---|---|---|---|---|
| | | | | RK4010/1 | RK4010/1 |
| Adhesive | 70° C. | 80° C. | 23° C. | PE 70° C. | Lead 70° C. |
| I | 210 | 175 | 53 | 2.5 | 2.5 |
| B | 230 | 160 | 46 | 3.5 | 4.0 |
| C | 225 | 205 | 69 | 9 | 10 |
| 20 | 220 | 160 | 62 | 6 | 6 |
| 21 | 210 | 150 | 60 | 5 | 4 |
| 22 | 185 | 105 | 78 | 2.5 | 2.0 |
| 23 | 205 | 180 | 75 | 3 | 2.5 |

EXAMPLE 9

A heat-shrinkable end cap for terminating telephone cables is made from a cross-linked modified polyolefin. The cap is 150 mm in length and has an expanded outer diameter of 95 mm and a recovered diameter of 70 mm. The recovered wallthickness is 3.8 mm.

The end cap is provided with an internal coating of an adhesive composition formulated in accordance with Example 6, sample 8, the thickness of the coating being about 0.7 mm. The adhesive is applied by hot melt coating with the cap in its expanded form.

The cap is placed about the end of the telephone cable and is caused to shrink by heating to a temperature of about 130° C. Upon recovery the adhesive flows and provides the desired adhesive seal in the encapsulated termination.

I claim:

1. An adhesive composition consisting essentially of (a) 100 parts by weight of a polyamide having a number average molecular weight of from 2000 to 10,000; a softening point of from 90° C. to 150° C. and an amine equivalent of from 70 to 400; and (b) from 5 to 50 parts by weight of a wax having a melting point in the range of 90° C. to 140° C. and a solid to liquid transition which takes place over a temperature range of not more than 30° C. as measured by DSC.

2. An adhesive composition according to claim 1, which also contains from 5 to 40 parts by weight of a tackifier.

3. An adhesive composition according to claim 2, wherein the tackifier is an aromatic tackifier.

4. An adhesive composition according to claim 2, wherein the tackifier is a terpene phenol resin.

5. An adhesive composition according to claim 1, which additionally contains up to 20% by weight, based on the weight of components (a) and (b) together, of a rubber.

6. An adhesive composition according to claim 5, wherein the rubber is an ethylene/propylene rubber.

7. An adhesive composition according to claim 5, wherein the rubber is a liquid or solid nitrile rubber.

8. An adhesive composition according to claim 1, wherein the polyamide has an amine equivalent of from 90 to 200.

9. An adhesive composition according to claim 1, wherein the polyamide has a molecular weight of from 3000 to 7000.

10. An adhesive composition according to claim 1, wherein the polyamide is predominantly based on a dimer acid.

11. An adhesive composition according to claim 1, wherein the wax is a natural or synthetic hydrocarbon or polyolefin wax having a molecular weight of from 300 to 10,000.

12. An adhesive composition according to claim 1, wherein the wax is a polyethylene wax having a molecular weight of from 1,000 to 5,000.

13. An adhesive composition according to claim 1, which additionally contains from 5 to 40 parts by weight of a plasticiser.

14. An adhesive composition consisting essentially of (a) 100 parts by weight of a polyamide based predominately on a dimer acid and having a molecular weight of from 3000 to 7000, an amine equivalent of from 90 to 200 and a softening point of from 90° C. to 150° C.; (b) from 5 to 20 parts by weight of a polyethylene based wax having a molecular weight not greater than 6000, said wax having a melting point in the range of 90° C. to 140° C. and a solid to liquid transition over a temperature range of not more than 30° C. as measured by DSC; and (c) from 5 to 20 parts by weight of an aromatic tackifier.

15. An adhesive composition according to claim 14, which additionally contains up to 20% by weight of a liquid or solid rubber modifier.

16. A heat shrinkable polymeric article at least one principal surface of which is coated with an adhesive composition consisting essentially of (a) 100 parts by weight of a polyamide having a number average molecular weight of from 2,000 to 10,000; a softening point of from 90° C. to 150° C. and an amine equivalent of from 70 to 400; and (b) from 5 to 50 parts by weight of a wax having a melting point in the range of 90° C. to 140° C. and a solid to liquid transition over a temperature range of not more than 30° C. as measured by DSC.

17. A heat shrinkable polymeric article at least one principal surface of which is coated with an adhesive composition consisting essentially of (a) 100 parts by weight of a polyamide based predominately on a dimer acid and having a molecular weight of from 3,000 to 7,000, an amine equivalent of from 90 to 200 and a softening point of from 90° C. to 150° C.; (b) from 5 to 20 parts by weight of a wax having a melting point in the range of 90° C. to 140° C. and a solid to liquid transition over a temperature range of not more than 30° C. as measured by DSC.

18. A heat-shrinkable polymeric article according to claim 17, wherein the adhesive composition additionally contains up to 20% by weight of a liquid or solid rubber modifier.

19. A heat-shrinkable polymeric article according to claim 17, which is a heat-shrinkable sleeve.

20. A heat-shrinkable polymeric article according to claim 17, which is a heat-shrinkable wrap-around sleeve.

* * * * *